G. H. SKINNER.
CARBURETING APPARATUS.
APPLICATION FILED JULY 13, 1908.
998,993.
Patented July 25, 1911.
3 SHEETS—SHEET 1.
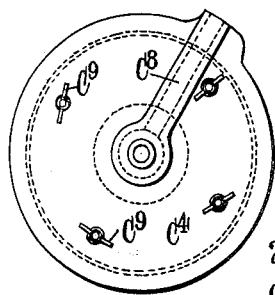
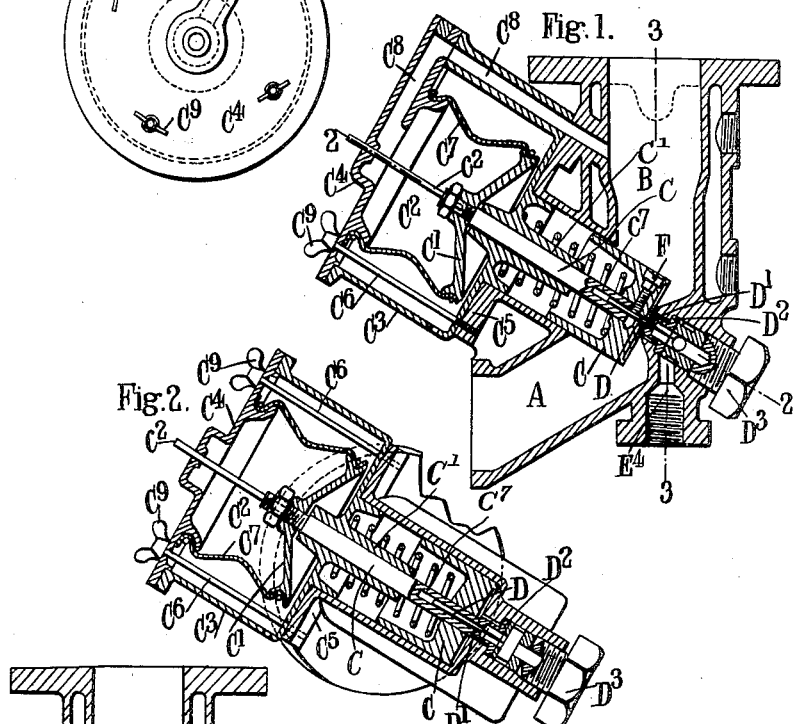
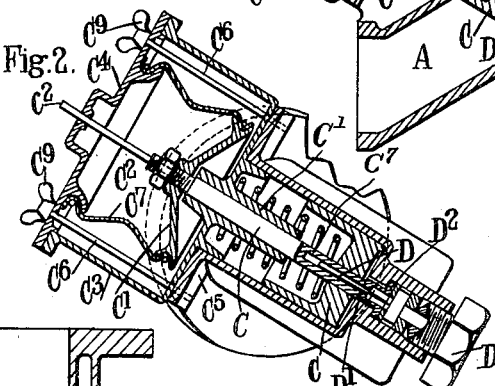
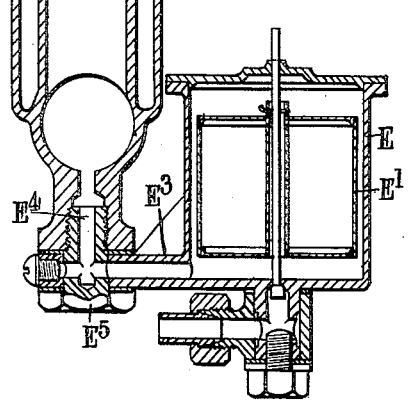
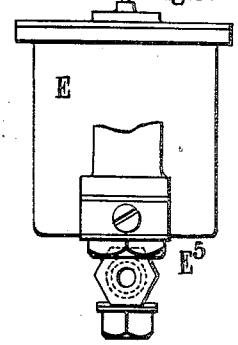
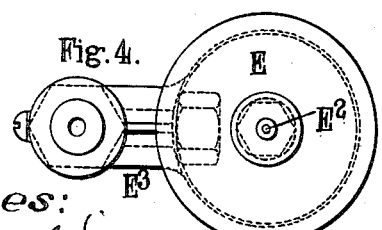
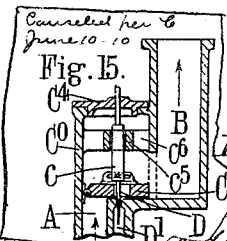
Witnesses:
P. F. Nagle
L. Douville
Inventor
George H. Skinner
By Wiederoheim & Fairbanks
Attorneys.

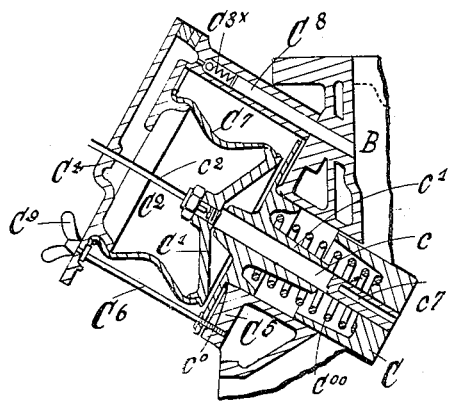
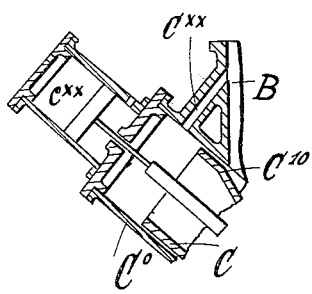
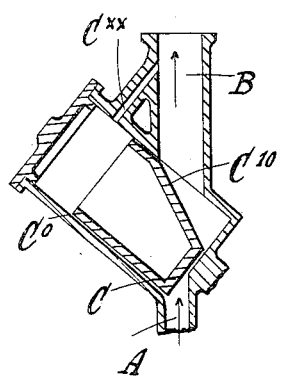

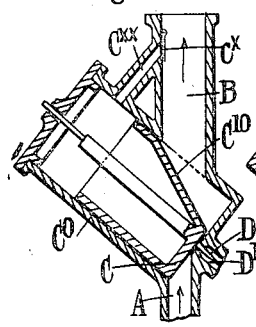
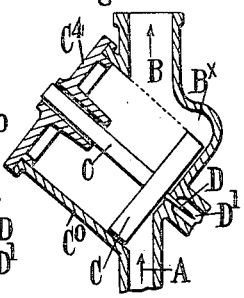
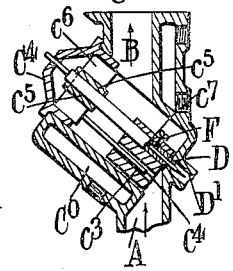
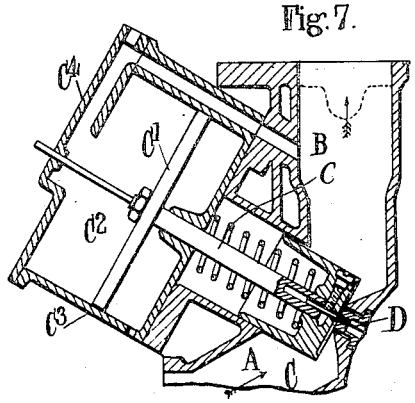
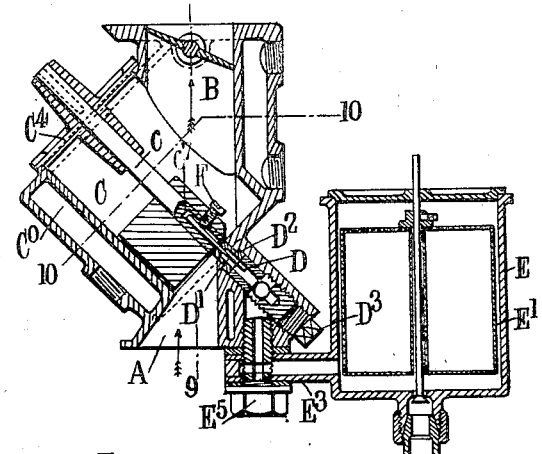
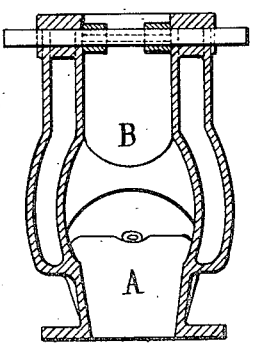

UNITED STATES PATENT OFFICE.

GEORGE HERBERT SKINNER, OF EALING, ENGLAND.

CARBURETING APPARATUS.

998,993. Specification of Letters Patent. Patented July 25, 1911.

Application filed July 13, 1908. Serial No. 443,399.

*To all whom it may concern:*

Be it known that I, GEORGE HERBERT SKINNER, a subject of the King of Great Britain, residing at 15 Woodville road, Ealing, in the county of London, England, have invented certain new and useful Improvements Relating to Carbureting Apparatus for Internal-Combustion Engines, of which the following is a specification.

This invention relates to carbureting apparatus for internal combustion engines, and has particular reference to apparatus of the kind set forth in the specification of my prior British Patent No. 3257 of 1905. According to this prior specification the carbureter is divided into two compartments one of which communicates with the air inlet and the other with the engine; these two compartments communicate with each other through an aperture or apertures, situated adjacent to or surrounding the hydrocarbon inlet or inlets and adapted to be automatically increased or diminished in accordance with the requirements of the engine by a valve which carries the needle valve for controlling the supply of hydrocarbon, so that the velocity of the air through the aperture or apertures and the ratio between the air and hydrocarbon will be kept practically constant.

The chief objects of the present invention are to provide means for regulating the size of the aforesaid aperture or apertures, in connection with the arrangements described in the said prior specification, and to enable certain parts of the apparatus to be readily adjusted or detached.

According to one form of my present invention the needle valve of the hydrocarbon inlet is carried by an air valve preferably of the piston type, which controls the passage of the induced air over the surface of the hydrocarbon inlet during the suction stroke of the engine, and which projects at its rear end into or forms a wall of a flexible or collapsible auxiliary suction chamber communicating with the compartment of the carbureter that leads to the engine cylinder. Consequently, during the suction stroke of the engine, the aforesaid piston valve will be promptly moved owing to the reduction in pressure in the auxiliary suction chamber at its rear end regardless of the difference of pressure in the two compartments of the carbureter, one of which compartments communicates with the air inlet and the other with the engine.

According to another form of my invention the piston valve, which carries the needle valve of the hydrocarbon inlet axially and controls the flow of the induced air diametrically across its front face, is so arranged that its rear face is acted upon or influenced by the suction of the engine without the aid of the collapsible suction chamber above referred to. For this purpose the aforesaid piston-valve may be provided with a head fitting into a chamber having a passage leading to the suction compartment of the carbureter. Or the piston valve may be arranged to reciprocate in a chamber or casing in direct communication with or forming part of the suction compartment of the carbureter, the said piston valve or the aforesaid chamber or casing being suitably shaped or formed to enable the aforesaid direct communication to be obtained.

In order that the said invention may be clearly understood and readily carried into effect, I will now proceed to describe the same more fully with reference to the accompanying drawings in which:—

Figure 1 is a vertical section of one form of carbureter constructed in accordance with my invention. Fig. 1ª illustrates certain modifications of the construction shown in Fig. 1. Fig. 2 is a section on the line 2—2 of Fig. 1 and Fig. 3 is a section on the line 3—3 of Fig. 1, showing also the float feed chamber for controlling the supply of hydrocarbon to the carbureter. Figs. 4 and 5 are a plan view and end elevation respectively of the float-feed chamber. Fig. 6 is a plan of the external face or cover plate of the auxiliary suction chamber shown in Fig. 1. Fig. 7 is a sectional elevation of a slightly modified construction of carbureter. Fig. 8 is a sectional elevation of a further modified form of carbureter; Fig. 9 being a sectional elevation on the line 9—9 of Fig. 8, and Fig. 10 a section on the line 10—10 of Fig. 8. Figs. 11, 11ª, 11ᵇ, 12 and 13, are sectional elevations of various other modified forms of carbureter constructed according to my invention.

A is the compartment of the carbureter that leads from the air inlet; B the compartment that leads to the engine cylinder; C the piston-valve separating these two compartments; and D the needle valve of the hydrocarbon inlet D'.

E is the float-feed chamber containing the float E' mounted on the spindle $E^2$ for controlling the supply of hydrocarbon to the carbureter.

Referring first more particularly to Figs. 1 to 6, the piston-valve rod $c$ of the piston-valve C is provided with a disk or head C', forming one wall of the auxiliary suction chamber $C^2$. The said disk or head C', which may be dish-shaped, is arranged within a casing $C^3$ having a cover plate $C^4$ secured thereto in any convenient manner. In Figs. 1 and 2, I have shown the said casing and cover plate attached to the body portion $C^5$ of the carbureter by a number of rods or bolts $C^6$, the threaded ends of which pass through the base of the casing $C^3$ and engage with the aforesaid body portion $C^5$. The cover plate $C^4$ and the disk C' are connected together by a flexible or collapsible wall or band $C^7$ so as to render the aforesaid suction chamber collapsible. A passage $C^8$ is formed in the cover plate and casing so as to put the suction chamber in communication with the carbureter compartment B which leads to the engine. During the suction stroke of the engine the reduction in pressure in the suction chamber $C^2$ will cause the disk or head C' to move toward the cover plate $C^4$, this movement being permitted by the flexible character of the chamber. The movement of the disk or head C' due to the contraction of the suction chamber $C^2$ causes a corresponding movement of the piston valve C and with it the needle valve D of the hydrocarbon inlet, so that the velocity of the air and the ratio between the air and hydrocarbon are kept practically constant. The piston valve rod $c$ is arranged to pass through a central boss $c'$ on the casing $C^3$, the end to which the disk or head C' is secured being preferably extended in the form of a rod or wire $c^2$ passing through an aperture in the cover plate $C^4$ so that by observing the position or movement of the said rod or wire it may easily be ascertained if the suction chamber is operating correctly; the rod or wire may also serve to manipulate the piston valve when desired. The rods or bolts $C^6$ which secure the cover plate and casing to the body portion of the carbureter may be provided with heads $C^9$ similar in shape to winged nuts so that they may be readily manipulated. By tightening or slackening one or more of these rods or bolts relatively to the others, the casing $C^3$ may be slightly tilted or displaced from its bearing on the body portion $C^5$ of the carbureter and a fine adjustment may thus be imparted to the needle in the orifice of the hydrocarbon inlet. To assist in the aforesaid slight tilting or displacement of the casing, the inner edge of the bearing between the casing and the body portion of the carbureter may be slightly rounded or coned or a small ridge may be provided as shown at $c^0$ (Fig. $1^a$) to allow the slight tilting movement of the casing in its bearing without incurring unnecessary stresses. When the rods or bolts are unscrewed, the auxiliary suction chamber $C^2$, casing $C^3$, piston-valve rod $c$ and piston valve C can easily be removed and replaced. In some cases the casing $C^3$ might be dispensed with, the passage $C^8$ then taking the form of a pipe leading from the cover plate $C^4$ to the carbureter compartment B, and the bolts or rods $c^6$ being provided with flanges to convert them into distance rods, as shown in Fig. $1^a$.

In the modification shown in Fig. 7, the casing $C^3$ itself forms the side wall of the auxiliary suction chamber $C^2$, the disk or head C' at the end of the piston valve rod $c$ being in the form of a piston head working in the chamber $C^2$, and the collapsible wall being dispensed with. In some carbureters, however, I prefer to dispense with the auxiliary suction chamber $C^2$ altogether, and form the body portion of the carbureter with a chamber or casing in which the piston valve works with its rear face in direct communication with the suction compartment B of the carbureter, the said valve or the aforesaid chamber or casing being suitably shaped or formed to enable this direct communication to be obtained. Figs. 8, 9 and 10 show one method of carrying this into effect. In this construction the piston-valve C works within the chamber $C^0$, the piston-valve rod $c$ passing through a hole in the cover plate $C^4$. The piston-valve C is partly cut-away at that portion which projects into the suction compartment B of the carbureter so that when the piston valve rises there will exist a free way from the inlet compartment A to the suction compartment B.

In the modification shown in Fig. 11 the piston valve chamber or casing $C^0$ communicates with the suction compartment B of the carbureter through a separate pipe or passage $C^{xx}$ which may in some cases be provided with a non-return valve $c^x$ as shown in Fig. 11, for preventing the partial vacuum produced at the rear of the piston valve during the suction stroke of the engine from becoming too quickly destroyed when the suction ceases; or a dash-pot arrangement, as shown at $c^{xx}$ in Fig. $11^a$ might be resorted to. Similarly a valve, such as the spring controlled ball valve $c^{8x}$ may, of course, be located in the passage $C^8$ of the arrangement as shown in Fig. $1^a$. In the construction shown in Fig. 11, the piston-valve C is cup-shaped, the bottom of the cup carrying the needle valve D on its external face, and the interior serving as the chamber from which the air is exhausted through the aforesaid pipe or passage $C^{xx}$ during the suction stroke of the engine. This cup shaped piston valve may be flattened or inclined on the side $C^{10}$ adjacent to the suction compartment B of the carbureter to allow the induced air to pass to the engine cylinder immediately the piston-valve moves under the action of the suction of the engine.

The passages or compartments leading from the air inlet to the piston valve and from the piston valve to the engine cylinder may be inclined to one another as shown in Figs. 1 and 7, with the piston valve C and its chamber or casing situated in the angle between them, or the said passages may be situated parallel to one another as in Figs. 11, 12 and 13, with the piston valve and its chamber or casing inclined thereto. In cases where the aforesaid passages are parallel to one another it might happen as shown in Fig. 12 that the piston valve C separating the two compartments A B would not permit them to communicate with each other during its initial movement and to obviate this a pocket or enlargement $B^x$ is provided so that immediately the piston valve rises, the air passing from the compartment A across the working face of the said piston valve flows into the pocket $B^x$ and hence along the compartment B. In order that the piston valve may return promptly to its seating, it may be made comparatively thick or heavy so as to move quickly under the action of gravity, or a spring may if desired be arranged to bear upon the rear face of the piston valve, as shown for example at $C^{oo}$, in Fig. 1ª.

In order to prevent the piston valve C from shifting angularly on its seating any convenient means may be employed, such means being particularly necessary in the case of the cut-away form of piston valve, the weight of which is, of course, unsymmetrically distributed. One arrangement may, for example, as shown in Fig. 13, comprise a guide rod $c^3$ projecting from the piston-valve chamber or casing and passing through a slot $c^4$ in the piston valve.

In carbureters that are to be employed on engines producing a high degree of suction I prefer to make the portion of the piston valve rod $c$ that projects through the end plate $C^4$ of the valve chamber or casing $C^0$ of small diameter so that the draft through the annular space between the said rod and the opening through which it projects may be reduced to the minimum thus avoiding moisture from the atmosphere from becoming deposited and accumulating in the aforesaid space, where it might ultimately freeze and prevent the piston valve rod from promptly responding to the variations of pressure in the carbureter. In this case the piston valve rod may be mounted, as shown in Fig. 13, in a bearing $c^5$ held in position within the chamber or casing by suitable web-pieces $c^6$ or the like extending from the bearing to the walls of the chamber or casing. In some cases, however, the piston valve rod may be dispensed with altogether, as shown in Fig. 11ᵇ.

In all forms of my invention hereinbefore set forth it is preferable that the needle valve D of the hydrocarbon inlet D' should be carried on the face of the piston valve in a central or axial position, so that any slight angular movement of the piston valve about its axis does not therefore affect the position of the needle valve with respect to the said hydrocarbon inlet. Also owing to the fact that the air passes transversely across the face of the piston valve and not around its periphery as in an ordinary disk valve, the piston valve has a considerable range of motion in responding to the varying volumes of air required to pass its face under the action of the varying degrees of suction in the engine.

In some of the forms of my invention the piston valve is shown provided with an axial recess $c^7$ into which the needle valve D of the hydrocarbon inlet is inserted. A set screw F passing through the side of the piston valve may be employed to fix the needle valve after the latter has been adjusted axially in the recess. Another method of insuring that the needle-valve is correctly situated for coöperation with the hydrocarbon inlet, consists in forming the hydrocarbon inlet D' in a removable plug $D^2$ which may be so constructed as to be capable of slight play in its seating as shown in Figs. 1 and 8.

Before placing the piston valve C and needle valve D in position, the clamping screw $D^3$ is slightly withdrawn so as to allow the removable plug $D^2$ to be loose or slack in its seating. On then placing the piston valve and its needle valve in position, the said needle valve D, which is preferably tapered and extends for some considerable distance through the hydrocarbon inlet D', will, if the latter is not in exact alinement with it, move the said plug until a true alinement is obtained. The clamping screw $D^3$ is then tightened up and thereby fixes the removable plug $D^2$ securely in its adjusted position.

The float feed chamber or reservoir E, in which the supply of hydrocarbon is contained and its feed regulated, is capable of ready detachment and its means of attachment are of such a character that the said feed chamber may be readily adjusted relatively to the carbureter without the necessity of removing its connecting screws or of detaching it. For this purpose the said float feed chamber is in the example shown formed with a lug or arm E³ which is secured to the carbureter at a point below the passage E⁴ leading to the hydrocarbon inlet so that the said float feed chamber may be moved around the said passage E⁴ as a center, and the most convenient position found before it is firmly secured in position. A set screw E⁵ may conveniently be employed to secure the aforesaid lug or arm E³ to the carbureter, both the set screw E⁵ and the lug or arm E³ being bored or drilled so as to provide a passage for the hydrocarbon from the float feed chamber E to the hydrocarbon inlet D′ in whatever position the float feed chamber may have been set.

What I claim and desire to secure by Letters Patent of the United States is:—

1. A carbureter for internal combustion engines, comprising a passage leading from the air inlet to the engine cylinder, an air-regulating valve placed with its axis inclined to that of the said passage and so as to normally obstruct the flow of air therethrough, a chamber in which the rear part of said air-regulating valve moves, a valve seating in the aforesaid passage arranged to extend transversely across the front end of said air regulating valve, a fuel supply needle valve carried by said air-regulating valve, a fuel inlet in the valve seating to coöperate with the said needle valve, and means for enabling the suction of the engine to raise the aforesaid air-regulating valve from its seating.

2. A carbureter for internal combustion engines, comprising a passage leading from the air inlet to the engine cylinder, an air-regulating valve placed with its axis inclined to that of the said passage and so as to normally obstruct the flow of air therethrough, a chamber in which the rear part of said air-regulating valve moves, a valve seating in the aforesaid passage arranged to extend transversely across the front end of said valve, a fuel supply needle valve axially carried by said air-regulating valve, a fuel inlet in the valve seating to coöperate with the said needle valve, and means for enabling the suction of the engine to raise the aforesaid air-regulating valve from its seating.

3. A carbureter for internal combustion engines, comprising a passage leading from the air inlet to the engine cylinder, an air-regulating valve placed with its axis inclined to that of the said passage and so as to normally obstruct the flow of air therethrough, a chamber in which the rear part of said air regulating valve moves, a valve seating in the aforesaid passage arranged to extend transversely across the front end of said valve, a fuel supply pipe connected with an aperture in said seating, a needle valve coöperating with the aforesaid aperture and carried by said air-regulating valve, a fuel inlet in the valve seating to coöperate with the said needle valve, and means for enabling the suction of the engine to raise the aforesaid air-regulating valve from its seating.

4. A carbureter for internal combustion engines comprising a passage leading from the air inlet to the engine cylinder, an air-regulating piston valve placed with its axis inclined to that of the said passage and so as to normally obstruct the flow of air therethrough, a chamber in which the rear part of said piston valve moves, a valve seating in the aforesaid passage arranged to extend diametrically across the front end of said piston valve, a fuel supply pipe connected with an aperture in said seating, a needle valve coöperating with the aforesaid aperture and carried by said piston valve axially, an auxiliary chamber having a movable wall attached to the rear end of the aforesaid piston valve, and means for enabling the suction of the engine to cause the movable wall to move in a direction to raise the air regulating valve from its seating.

5. A carbureter for internal combustion engines comprising a passage leading from the air inlet to the engine cylinder, an air-regulating piston valve situated to normally obstruct the flow of air along the said passage, a chamber in which the rear part of said air regulating valve moves, a valve seating in the aforesaid passage arranged to extend diametrically across the front end of said piston valve, a fuel supply pipe connected with an aperture in said seating, a needle valve coöperating with the aforesaid aperture and carried by said piston valve axially, a collapsible auxiliary chamber having a movable wall attached to the rear end of the aforesaid piston valve, and means for enabling the suction of the engine to cause the movable wall to move in a direction to raise the air regulating valve from its seating.

6. A carbureter for internal combustion engines, comprising a passage leading from the air inlet to the engine cylinder, an air-regulating piston valve situated to normally obstruct the flow of air along the said passage, a chamber in which the rear part of said piston-valve moves, a valve seating in the aforesaid passage arranged to extend diametrically across the front end of said piston-valve, a fuel supply pipe connected with an aperture in said seating, a needle valve coöperating with the aforesaid aperture and carried by said piston-valve axially, a head attached to the rear end of the piston-valve, a cover plate, a flexible wall extending between the head and the cover plate to form an auxiliary collapsible chamber, and means for enabling the suction of the engine to cause the aforesaid head to move in a direction to raise the air-regulating valve from its seating.

7. A carbureter for internal combustion engines comprising a passage leading from the air inlet to the engine cylinder, an air-regulating piston valve situated to normally obstruct the flow of air along the aforesaid passage, a valve seating in the aforesaid passage arranged to extend diametrically across the front end of said valve, a fuel supply needle valve carried on the front end of said piston valve axially, an open-ended chamber in which the rear part of said piston valve moves, a detachable casing at the rear of the aforesaid open-ended chamber, a collapsible auxiliary chamber within said detachable casing, a head attached to the rear end of the air-regulating valve and serving as a movable wall of the collapsible auxiliary chamber, and means for enabling the suction of the engine to cause the movable wall to move in a direction to raise the air regulating valve from its seating.

8. A carbureter for internal combustion engines comprising a passage leading from the air inlet to the engine cylinder, an air-regulating valve placed with its axis inclined to that of the said passage and so as to normally obstruct the flow of air therethrough, a chamber in which the rear part of said air-regulating valve moves, a valve seating in the aforesaid passage arranged to extend transversely across the front end of said valve, means for enabling the suction of the engine to raise the aforesaid air-regulating valve from its seating, a fuel inlet nozzle laterally movable in said seating, a needle valve in the front end of the air-regulating valve for coöperation with the said movable nozzle, and means for fixing the nozzle in position.

9. A carbureter for internal combustion engines comprising a passage leading from the air inlet to the engine cylinder, an air-regulating valve placed with its axis inclined to that of the said passage and so as to normally obstruct the flow of air therethrough, a chamber in which the rear part of said air-regulating valve moves, a valve seating in the aforesaid passage arranged to extend transversely across the front end of said valve, a needle valve carried by the air-regulating valve, a fuel inlet in the valve seating to coöperate with the said needle valve, means for enabling the suction of the engine to raise the aforesaid air-regulating valve from its seating, a float feed chamber containing fuel, a lug extending laterally from the bottom of said float feed chamber, and a screw for fixing said lug to the carbureter below the needle valve, the aforesaid lug and screw being drilled to permit the passage of the fuel through them.

10. A carbureter for internal combustion engines comprising a passage leading from the air inlet to the engine cylinder, an air-regulating piston valve placed with its axis inclined to that of the said passage and so as to normally obstruct the flow of air therethrough, a chamber in which the rear part of said air-regulating valve moves, a valve seating in the aforesaid passage arranged to extend transversely across the front end of said piston valve, a needle valve carried by the air-regulating valve, a fuel inlet in the valve seating to coöperate with the said needle valve, means for enabling the suction of the engine to raise the aforesaid air-regulating valve from its seating, a valve rod extending rearwardly from the aforesaid piston valve, and an extension of said valve rod of smaller diameter than the latter and projecting outside the carbureter.

In testimony whereof I affix my signature in presence of two witnesses.

GEORGE HERBERT SKINNER.

Witnesses:
 T. SELBY WARDLE,
 GEORGE I. BRIDGES.